United States Patent [19]
Patel

[11] Patent Number: 5,910,205
[45] Date of Patent: Jun. 8, 1999

[54] BREW BASKET FOR COFFEE-MAKING MACHINE

[75] Inventor: Dahyabhai U. Patel, Vancouver, Canada

[73] Assignee: Cafe 98 Industries Limited, Canada

[21] Appl. No.: 08/899,894

[22] Filed: Jul. 24, 1997

[51] Int. Cl.⁶ ................................................. A47J 31/04
[52] U.S. Cl. ................... 99/315; 99/307; 99/323
[58] Field of Search ............................ 99/304, 305, 306, 99/307, 315, 323; 210/455, 474, 473, 470

[56] References Cited

U.S. PATENT DOCUMENTS

| | | | |
|---|---|---|---|
| 1,870,254 | 8/1932 | Kircher et al. ............................. | 99/306 |
| 1,953,291 | 4/1934 | DeVry ..................................... | 99/306 X |
| 3,080,810 | 3/1963 | Saint ....................................... | 99/315 X |
| 3,587,444 | 6/1971 | Godel et al. ........................... | 99/306 X |
| 3,975,996 | 8/1976 | Vitous .................................... | 99/304 X |
| 4,070,956 | 1/1978 | Brown ..................................... | 99/304 |
| 4,138,936 | 2/1979 | Williams ................................. | 99/306 X |

*Primary Examiner*—Reginald L. Alexander
*Attorney, Agent, or Firm*—Fitzpatrick, Cella, Harper & Scinto

[57] ABSTRACT

A brew basket to hold ground coffee through which water is to pass includes a basket member to support a bed of ground coffee. The basket member has at least one opening therein to permit the egress of water having passed through the bed of coffee. A pan is positioned above the bed of ground coffee to collect water entering the brew basket. The pan has a plurality of spaced holes therein to distribute collected water generally uniformly and gently over the bed of coffee. A coffee-making machine having a sprayhead including a pan to collect water and distribute collected water generally uniformly and evenly over a bed of ground coffee is also provided.

26 Claims, 6 Drawing Sheets

BREW BASKET FOR COFFEE-MAKING MACHINE

FIELD OF THE INVENTION

The present invention relates to coffee-making equipment and in particular to a brew basket for a coffee-making machine and to a sprayhead for a coffee-making machine.

BACKGROUND OF THE INVENTION

Brewing good coffee is an art and the key to success lies in finding the optimum balance between the strength of the brewed coffee and the degree of extraction from the ground coffee. The coffee brewing process proceeds in three stages namely, wetting, extraction and hydrolysis. During the wetting stage, as the coffee bean fiber absorbs hot water, gas is driven from the coffee particles and interstitial voids inside the coffee particles preparing the coffee particles for extraction of solubles. In the extraction stage, water-soluble flavoring compounds dissolve and rapidly move out of the coffee bean fibers and enter the water. In the hydrolysis stage, large molecules of water-insoluble carbohydrates break down into smaller molecules that are water soluble. As should be appreciated, the design and operation of coffee-brewing equipment affects the three stages in the brewing process and therefore, has a direct influence on the quality of brewed coffee.

In conventional coffee-making machines, hot water is drawn from a reservoir and is discharged into a brew basket via a sprayhead. The brew basket holds a filter and a bed of ground coffee within the filter. Hot water discharged into the brew basket, percolates through the bed of ground coffee and exits the brew basket as coffee. The hot coffee exiting the brew basket is collected by a server.

To achieve uniform wetting and extraction, the hot water contacting the bed of ground coffee must lift and separate the coffee grounds, a mixing action referred to as turbulence. Improperly applying water to the bed of ground coffee can contribute to poor brewed coffee. Conventional sprayheads tend to concentrate turbulence in the center of the brew basket. Since the bed of ground coffee is wetted down with more pressure at some areas than other areas, the brewed coffee is inconsistent and over-extracted.

To date, the design of brew baskets to hold ground coffee and coffee making machine sprayheads have not achieved the desired results. Accordingly, improved coffee-making equipment to produce a better quality brew is desired.

It is therefore and object of the invention to provide a novel brew basket for a coffee-making machine and a novel coffee-making machine sprayhead.

SUMMARY OF THE INVENTION

According to one aspect of the present invention there is provided a brew basket to hold ground coffee through which water is to pass comprising:

a basket member to support a bed of ground coffee and having at least one opening therein to permit the egress of water having passed through said bed of ground coffee; and a pan above said bed of ground coffee to collect water entering said brew basket, said pan having a plurality of spaced holes therein to distribute collected water generally uniformly over said bed of ground coffee.

Preferably, the pan is configured to provide sufficient head for water collected therein to achieve generally even flow through the holes. In one embodiment, the pan includes a base having a plurality of wells formed therein and at least one sidewall about the periphery of the base. The spaced holes are in the form of depending nozzles provided in the base at the wells. Preferably, the wells are defined by concentric depressions formed in the base with the nozzles being generally equally spaced about the depressions.

Preferably, a lid having a central aperture therein overlies the basket member and is moveable relative to the basket member to expose the interior of the basket member. The pan is positioned between the lid and the basket member and collects water passing through the aperture in the lid. In a preferred embodiment, the lid is pivotably mounted on the basket member and the pan is secured to an undersurface of the lid.

Preferably, the basket member includes a base and at least one sidewall about the periphery about the base. The interior surface of the base has a plurality of generally radially extending fins thereon. It is also preferred that a screen is positioned within the basket member adjacent the fins.

According to another aspect of the present invention there is provided a brew basket to hold a bed of ground coffee through which water is to pass comprising:

a basket member including a base having at least one opening therein to permit the egress of water having passed through said bed of ground coffee and at least one sidewall about the periphery of said base, said base having a plurality of generally radially extending fins thereon; and a screen within said basket member adjacent said fins on which said bed of ground coffee is supported.

According to still yet another aspect of the present invention there is provided a coffee-making machine of the type to deliver hot water to a bed of ground coffee comprising:

a reservoir to hold water;

a heater to heat water held in said reservoir;

a sprayhead to overlie a vessel into which brewed coffee is to enter, said sprayhead being in fluid communication with said reservoir and including a discharge outlet and a pan below said discharge outlet to collect water exiting said discharge outlet, said pan having a plurality of spaced holes therein to distribute collected water generally uniformly over a bed of ground coffee interposed between said vessel and said sprayhead.

The present invention provides advantages in that water entering the brew basket is distributed generally uniformly and gently and at a generally even flow rate over the bed of ground coffee. The entire bed of ground coffee therefore receives generally equal treatment and adequate turbulence improving the stages of the brewing process and resulting in better quality, consistent brewed coffee.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

Figure 1:
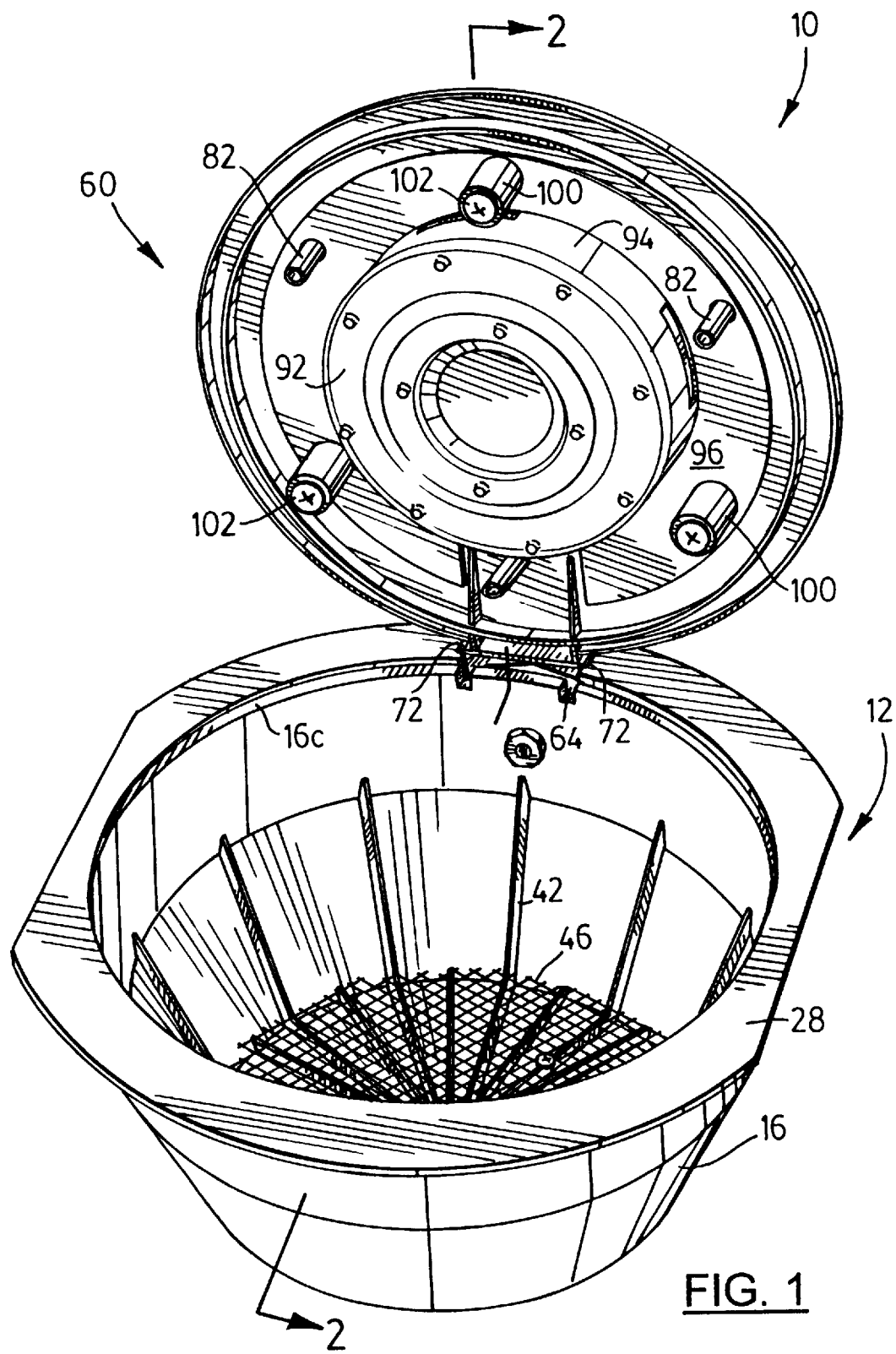
FIG. 1 is a perspective view of a brew basket in accordance with the present invention with the brew basket lid in an open condition.
Figure 2:
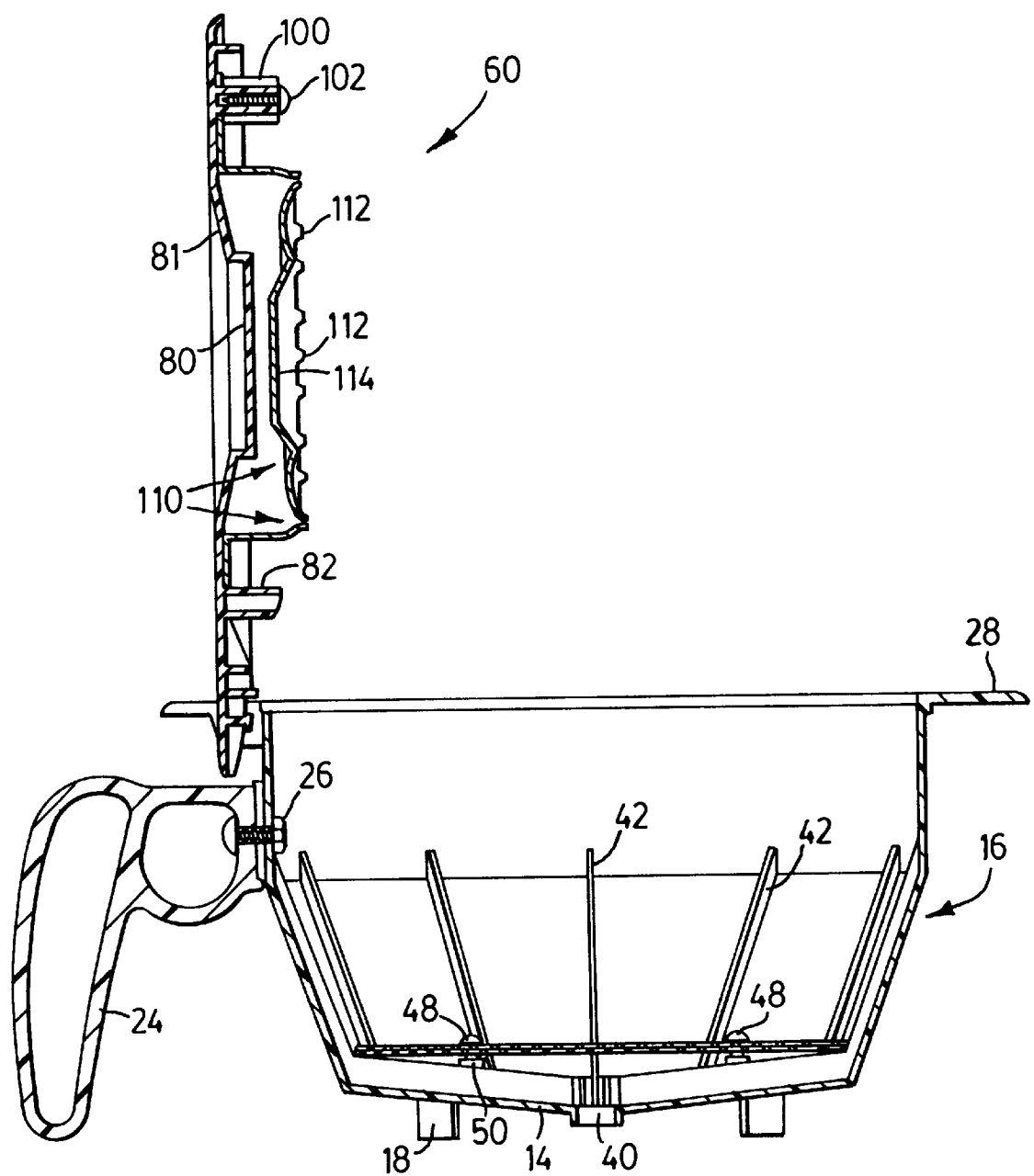
FIG. 2 is a cross-sectional view of the brew basket of FIG. 1 taken along line 2—2.
Figure 3:
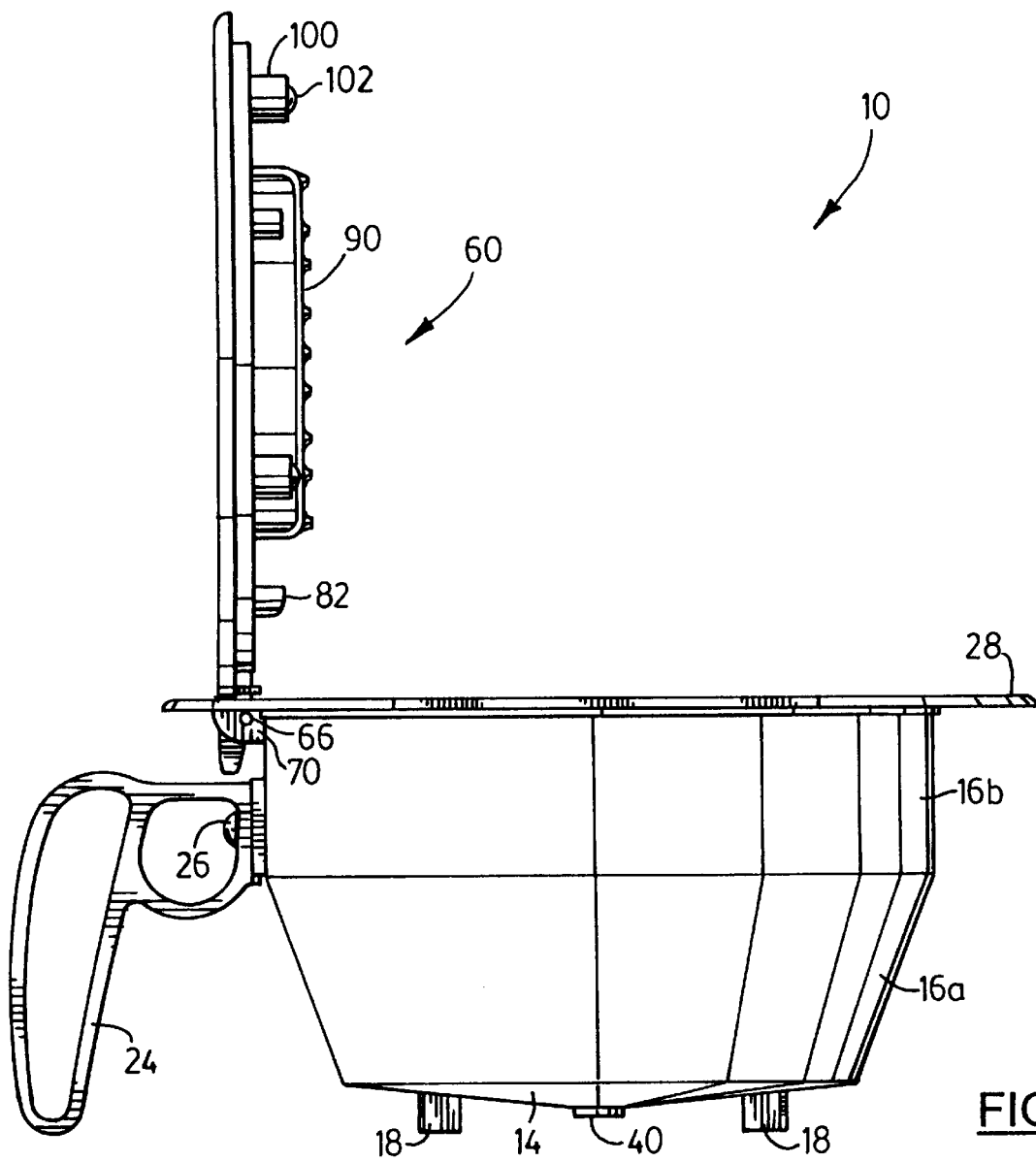
FIG. 3 is a side elevational view of the brew basket of FIG. 1.
Figure 4:
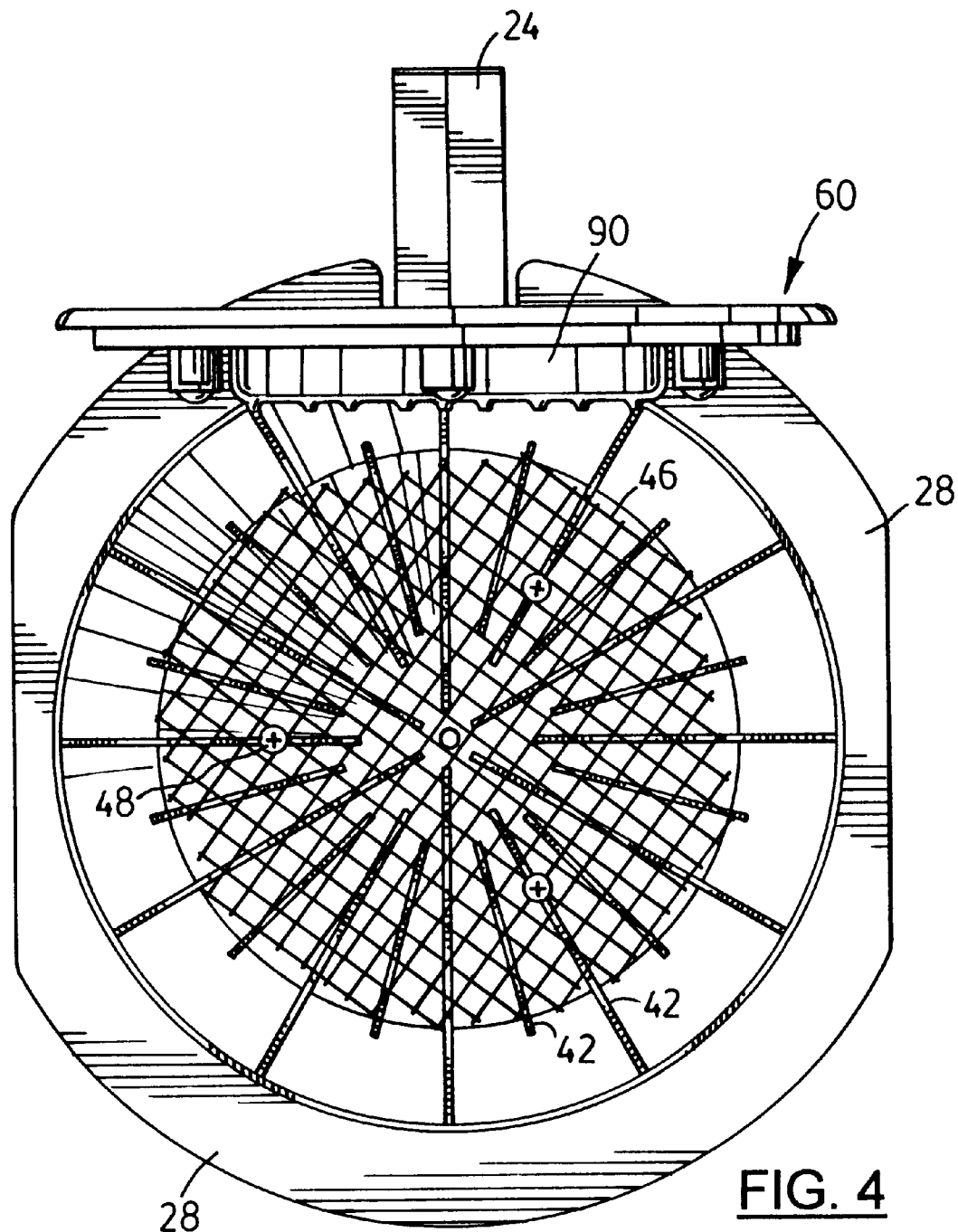
FIG. 4 is a top plan view of the brew basket of FIG. 1.
Figure 5:
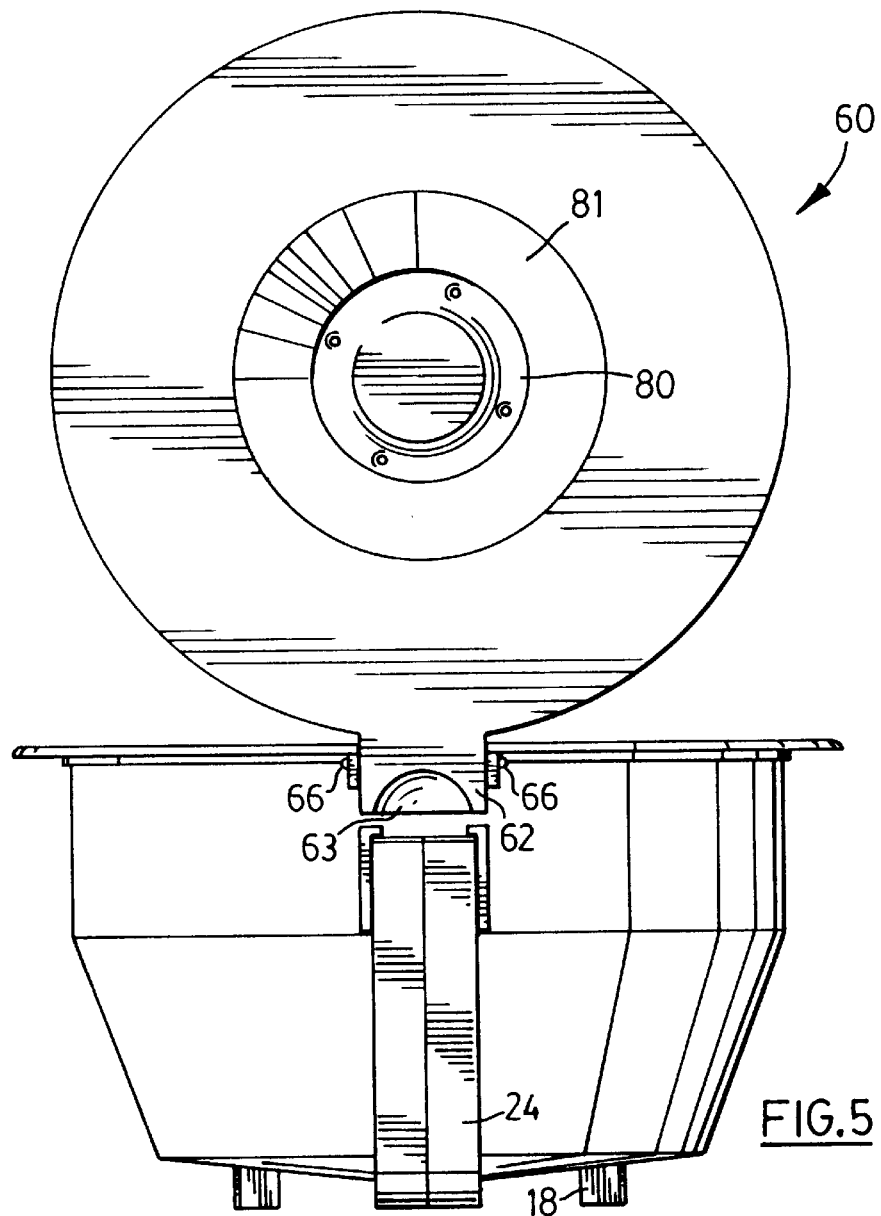
FIG. 5 is a rear elevational view of the brew basket of FIG. 1.

Referring now to FIGS. 1 to 5, a brew basket for use with a coffee-making machine is shown and is generally indicated to by reference numeral 10. The brew basket includes a basket member 12 formed of plastic material having a generally circular base 14 and an upright sidewall 16 about the periphery of the base. A plurality of circumferentially spaced legs 18 depend from the base 14 to support the brew basket 10 in a stable manner when it is placed on a flat surface. The sidewall 16 includes a generally conical lower section 16a and a generally cylindrical upper section 16b. A handle 24 is secured to the upper section 16b by way of a fastener 26 in the form of a nut and bolt to facilitate carrying of the brew basket 10. A flange 28 extends outwardly from the top of the sidewall about its entire periphery.

A passage 40 is provided through the center of the base 14 to permit water entering the brew basket 10 to exit. A plurality of radially extending fins 42 are also provided on the base within the basket member 12. Some of the fins 42 extend upwardly along the sidewall 16 and terminate slightly above the lower conical section 16a. A metal screen 46 is positioned within the basket member 12 and is disposed above the fins 42. The screen 46 is secured to the basket member by fasteners 48 engaging threaded posts 50 on the base 14.

A generally circular, plastic lid 60 is pivotally mounted on the basket member 12 and is moveable between a closed condition where the lid overlies the basket member and rests on the upper surface 16c of the sidewall 16 and an open position where the interior of the basket member 12 is exposed. A tab 62 having a depression 63 formed therein extends from the lid 60 and is accommodated by a cutout 64 in the flange 28 positioned above the handle 24. Trunions 66 are formed on the tab 62 and are accommodated by holes provided in supports 70 located beneath the flange 28 and on opposite edges of the cutout 64. Notches 72 are also formed in the flange 28 above the supports 70 to allow the lid 60 to be removed from the basket member 12.

Figure 6:
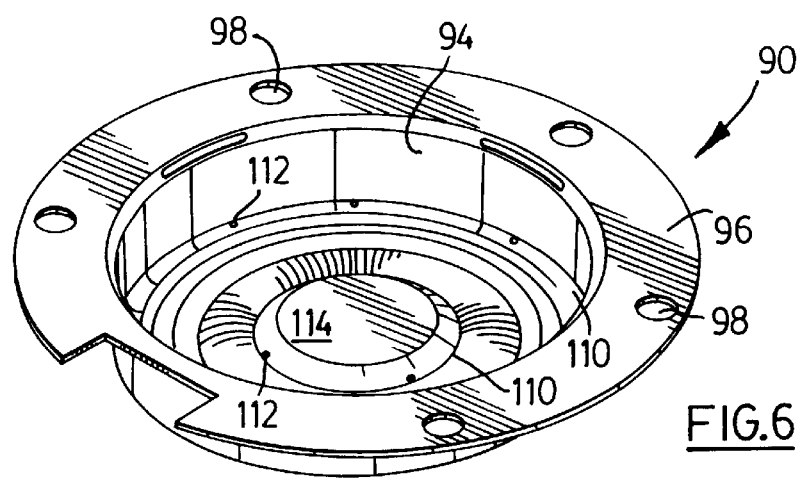
FIG. 6 is a perspective view of a portion of the brew basket of FIG. 1.

An aperture 80 is centrally provided in the lid 60 and is surrounded by a depression 81 formed in the upper surface of the lid 60. A plurality of circumferentially spaced posts 82 depend from the undersurface of the lid. A metal pan 90 (best seen in FIG. 6) is secured to the undersurface of the lid. The pan 90 includes a generally circular base 92, an upright sidewall 94 extending about the periphery of the base and an outwardly extending flange 96 about the periphery of the sidewall 94. The flange 96 presents a planar upper surface in contact with the undersurface of the lid 60 and has a plurality of holes 98 therein through which the posts 82 pass. Selected ones of the posts 82 are surrounded by washers 100 and accommodate threaded fasteners 102 securing the pan 90 to the undersurface of the lid 60.

The base 92 has a plurality of concentric depressions 110 formed therein defining wells. In the present embodiment, the base 92 has inner and outer concentric depressions therein. A plurality of generally equally, spaced nozzles 112 are provided in the base 92 at the depressions 110. The nozzles provided in the inner depression are radially offset from the nozzles provided in the outer depression. In the present embodiment, the nozzles 112 depend from the base 92 by a distance equal to about 0.0325" and have exit diameters in the range of about 0.068" to 0.072". Centrally positioned on the base 92 and in line with the aperture 80 in the lid is a raised section 114 to deflect water entering the pan 90 radially outwardly. A plurality of rectangular openings 116 are provided in the sidewall 94 adjacent the flange at spaced locations to permit water held in the pan to exit the pan upon tilting of the brew basket 10.

The brew basket 10 is designed to be used with coffee-making machines of the type which deliver hot water to a bed of ground coffee. The coffee-making machine may be of the type which draws water from a mains water supply such as that shown in U.S. Pat. No. 5,063,836 to Patel or of the type in which water is manually poured into a reservoir within the coffee-making machine.

In use, the lid 60 of the brew basket 10 is pivoted to the open position and a filter holding a bed of ground coffee is placed within the brew basket. The lid is then pivoted to the closed position and the brew basket 10 is placed on the coffee-making machine by sliding the brew basket between a pair of spaced rails on the coffee-making machine so that the rails support the flange 28. In this position, the brew basket is position beneath the sprayhead of the coffee-making machine.

When the brewing process begins, hot water is discharged by the sprayhead and passes through the hole 80 in the lid. The hot water is then deflected by the central raised section 114 and is collected by the pan 90. As water is collected by the pan 90, the wells 110 are filled.

The filled wells 110 provide sufficient head so that water exits the pan 90 via the nozzles 112 in a generally even, uniform and gentle manner. The depending nozzles 112 inhibit hot water exiting the nozzles from running along the undersurface of the pan 90. The nozzles 112 are positioned about the pan so that hot water exiting the pan 90 contacts the bed of ground coffee generally over its entire surface. Water contacting the bed of ground coffee creates turbulence therein as it percolates through the bed of ground coffee and filter and is channeled by the fins 42 to the passage 40 where the coffee exits the brew basket 10. The brewed coffee is then collected by a server such as that shown in U.S. Pat. No. 5,038,959 to Patel. The brew basket 10 regulates the flow of hot water therethrough so that the bed of ground coffee remains in suspension in a pool of hot water throughout most of the brewing cycle.

The screen 46 and the fins 42 serve to space the filter from the base 14 and sidewall 16 of the basket member to allow hot water to flow generally through the bed of ground coffee and filter in an unimpeded manner.

Although the pan 90 as shown is secured to the undersurface of the lid 60, it should be appreciated that the pan may be separate from the lid and take the form of an inset to be placed within the basket member 12 above a bed of ground coffee. In this case, the pan is sized so that the flange 96 overlies the upper surface 16c of the sidewall to support the pan above the bed of ground coffee.

Figure 7:
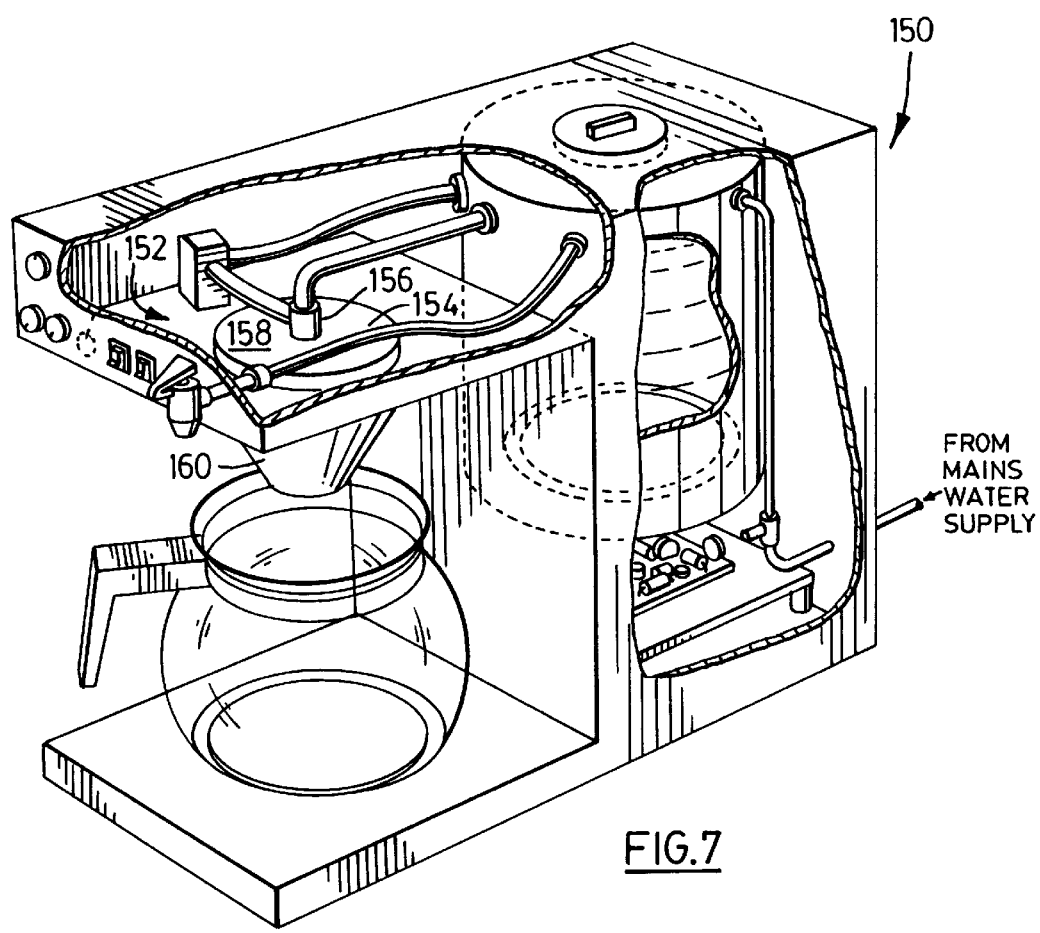
FIG. 7 is a perspective view of a coffee-making machine having a sprayhead in accordance with the present invention.

The pan may also be incorporated into a coffee-making machine 150 as shown in FIG. 7 and form part of the sprayhead 152. In this case, the pan 154 is positioned within the coffee-making machine below a discharge outlet 156 and includes an upper surface 158 on which the discharge outlet is mounted. Thus, water exiting the discharge outlet is collected by the pan before the water is discharged from the sprayhead into the brew basket. In this manner, a conventional brew basket 160 can be used to hold the filter and bed of ground coffee.

The present invention provides advantages in that the quality of brewed coffee is increased. This is achieved by discharging hot water over generally the entire upper surface bed of ground coffee in a gentle and uniform manner.

Although preferred embodiments of the present invention have been described, those of skill in the art will appreciate that variations and modifications may be made without departing from the spirit and scope thereof as defined by the appended claims.

I claim:

1. A brew basket to hold ground coffee through which water is to pass, comprising:
    a basket member to support a bed of ground coffee and having at least one opening therein to permit the egress of water having passed through said bed of ground coffee; and
    a pan above said bed of ground coffee to collect water entering said brew basket, said pan including a base having a plurality of wells formed therein and having a plurality of spaced holes provided therethrough at said wells to distribute collected water generally uniformly over said bed of ground coffee, said wells being configured to provide sufficient head for water collected by said pan to achieve generally even flow of water through said holes.

2. A brew basket as defined in claim 1 further comprising a lid overlying said basket member and moveable relative to said basket member to expose the interior of said basket member, said lid having at least one aperture therein, said pan collecting water passing through said at least one aperture in said lid.

3. A brew basket as defined in claim 2 wherein said lid is pivotally mounted on said basket member and wherein said pan is secured to an undersurface of said lid.

4. A brew basket as defined in claim 3 wherein said pan includes at least one sidewall, said at least one sidewall having at least one opening therein to permit the egress of water from said pan upon tilting of said brew basket.

5. A brew basket as defined in claim 1 wherein said basket member includes a base and at least one sidewall about the periphery of said base, said base having a plurality of generally radially extending fins thereon.

6. A brew basket as defined in claim 5 further comprising a screen within said basket member adjacent said fins.

7. A brew basket as defined in claim 6 wherein some of said fins extend along said at least one sidewall of said basket member.

8. A brew basket as defined in claim 1 wherein said holes are defined by depending nozzles on said base.

9. A brew basket as defined in claim 8 wherein said wells are defined by concentric depressions formed in said base, said nozzles being generally equally spaced about said depressions.

10. A brew basket as defined in claim 9 wherein said base has a pair of concentric depressions therein, the nozzles in an outer one of said depressions being radially offset from the nozzles in an inner one of said depressions.

11. A brew basket as defined in claim 8 wherein each of said nozzles depends from said base by a distance generally equal to about 0.0325 inches.

12. A brew basket as defined in claim 11 wherein each of said nozzles has an exit diameter in the range of from about 0.068 inches to about 0.072 inches.

13. A coffee-making machine of the type to deliver hot water to a bed of ground coffee, comprising:
    a reservoir to hold water;
    a heater to heat water held in said reservoir; and
    a sprayhead to overlie a vessel into which brewed coffee is to enter, said sprayhead being in fluid communication with said reservoir and including a discharge outlet and a pan below said discharge outlet to collect water exiting said discharge outlet, said pan including a base having a plurality of wells formed therein and having a plurality of spaced holes provided therethrough at said wells to distribute collected water generally uniformly over a bed of ground coffee interposed between said vessel and said sprayhead, said wells being configured to provide sufficient head for water collected in said pan to achieve generally even flow of water through said holes.

14. A coffee-making machine as defined in claim 13 wherein said holes are defined by depending nozzles on said base.

15. A coffee-making machine as defined in claim 14 wherein each of said nozzles depends from said base by a distance generally equal to about 0.0325 inches.

16. A coffee-making machine as defined in claim 15 wherein each of said nozzles has an exit diameter in the range from about 0.068 inches to about 0.072 inches.

17. A coffee-making machine as defined in claim 14 wherein said wells are defined by concentric depressions formed in said base, said nozzles being generally equally spaced about said depressions.

18. A coffee-making machine as defined in claim 17 wherein said base has a pair of concentric depressions therein, the nozzles in an outer one of said depressions being radially offset from the nozzles in an inner one of said depressions.

19. A brew basket to hold ground coffee through which water is to pass comprising:
    a basket member to support a bed of ground coffee and having at least one opening therein to permit the egress of water having passed through said bed of ground coffee; and
    a pan above said bed of ground coffee to collect water entering said brew basket, said pan including a base having a plurality of wells formed therein, at least one sidewall about the periphery of said base, and a plurality of spaced holes provided in said base at said wells to distribute collected water generally uniformly over said bed of ground coffee, said wells being defined by concentric depressions formed in said base and being configured to provide sufficient head for water collected by said pan to achieve generally even flow of water through said holes.

20. A brew basket as defined in claim 19 wherein said holes are defined by depending nozzles on said base, said nozzles being generally equally spaced about said depressions.

21. A brew basket as defined in claim 20 wherein said base has a pair of concentric depressions therein, the nozzles in an outer one of said depressions being radially offset from the nozzles in an inner one of said depressions.

22. A brew basket as defined in claim 19 further comprising a lid overlying said basket member and moveable relative to said basket member to expose the interior thereof, said lid having at least one aperture therein, said pan collecting water passing through said at least one aperture.

23. A brew basket as defined in claim 19 wherein said basket member includes a base, at least one sidewall about the periphery of said base, a plurality of generally radially extending fins on said base, and a screen within said basket member adjacent said fins.

24. A brew basket as defined in claim 19 wherein each of said nozzles depends from said base by a distance generally equal to about 0.0325 inches.

25. A brew basket as defined in claim 22 wherein said pan is secured to an undersurface of said lid.

26. A brew basket as defined in claim 25 wherein said base is generally circular in plan, said pan including a sidewall about the periphery of said base having at least one opening therein to permit water to exit said pan upon tilting of said brew basket.

* * * * *